(12) United States Patent
Ko et al.

(10) Patent No.: US 12,633,581 B2
(45) Date of Patent: May 19, 2026

(54) ELECTRODE SURFACE INSPECTION DEVICE

(71) Applicant: LG ENERGY SOLUTION, LTD., Seoul (KR)

(72) Inventors: Hongjae Ko, Daejeon (KR); Tae Young Kim, Daejeon (KR); Seung Gyun Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 253 days.

(21) Appl. No.: 18/572,953

(22) PCT Filed: Jul. 26, 2022

(86) PCT No.: PCT/KR2022/010950
§ 371 (c)(1),
(2) Date: Dec. 21, 2023

(87) PCT Pub. No.: WO2023/068496
PCT Pub. Date: Apr. 27, 2023

(65) Prior Publication Data
US 2024/0372161 A1     Nov. 7, 2024

(30) Foreign Application Priority Data

Oct. 20, 2021     (KR) ........................ 10-2021-0140199

(51) Int. Cl.
*H01M 10/42* (2006.01)
*G01N 21/88* (2006.01)
(Continued)

(52) U.S. Cl.
CPC .... *H01M 10/4285* (2013.01); *G01N 21/8806* (2013.01); *H04N 23/56* (2023.01); *H04N 23/90* (2023.01); *G01N 2201/0636* (2013.01)

(58) Field of Classification Search
None
See application file for complete search history.

(56) References Cited

U.S. PATENT DOCUMENTS 6,646,733 B1 * 11/2003 Marttila ............. G01N 21/8422
850/10
11,113,803 B2     9/2021 Saphier et al.
(Continued)

FOREIGN PATENT DOCUMENTS

CN          202362253 U     8/2012
CN          108333188 A     7/2018
(Continued)

OTHER PUBLICATIONS

Office Action dated Jan. 21, 2025 issued in Japanese Patent Application No. 2023-574479.
(Continued)

*Primary Examiner* — Leon Flores
(74) *Attorney, Agent, or Firm* — Morgan, Lewis & Bockius LLP

(57) ABSTRACT

An electrode surface inspection device may include a transport unit configured to transport an electrode; a lighting configured to illuminate at least one side of the electrode; and a camera configured to capture a plurality of images including images of a plurality of adjacent regions along a longitudinal direction of the electrode on at least one side of the electrode, and configured to crop the images of the plurality of adjacent regions of the electrode to acquire images of the plurality of adjacent regions of the electrode.

11 Claims, 4 Drawing Sheets

(51) Int. Cl.
  *H04N 23/56* (2023.01)
  *H04N 23/90* (2023.01)

(56) References Cited

U.S. PATENT DOCUMENTS

| | | | |
|---|---|---|---|
| 2001/0040225 | A1 | 11/2001 | Kodama et al. |
| 2010/0309308 | A1 | 12/2010 | Saphier et al. |
| 2015/0077538 | A1 | 3/2015 | Krebs |
| 2018/0113078 | A1 | 4/2018 | Herrmann et al. |
| 2021/0265673 | A1* | 8/2021 | Jordan ................ H01M 50/105 |
| 2022/0216501 | A1* | 7/2022 | Oh .................... H01M 10/0404 |

FOREIGN PATENT DOCUMENTS

| | | | |
|---|---|---|---|
| CN | 109738454 A | 5/2019 | |
| CN | 110501341 A | 11/2019 | |
| CN | 111161228 A | 5/2020 | |
| CN | 211122585 U | 7/2020 | |
| CN | 110544231 B | 5/2021 | |
| DE | 10 2012 101 310 B3 | 4/2013 | |
| JP | H06-167322 A | 6/1994 | |
| JP | H08-254499 A | 10/1996 | |
| JP | 2003-132875 A | 5/2003 | |
| JP | 2007322269 A | 12/2007 | |
| JP | 2010-025566 A | 2/2010 | |
| JP | 2011-510289 A | 3/2011 | |
| JP | 2016-108081 A | 6/2016 | |
| JP | 2017-198462 A | 11/2017 | |
| JP | 2018-077218 A | 5/2018 | |
| JP | WO2018105099 A1 | 7/2019 | |
| JP | 6676573 B2 | 4/2020 | |
| KR | 10-1380858 B1 | 4/2014 | |
| KR | 10-1473569 B1 | 12/2014 | |
| KR | 10-1940449 B1 | 1/2019 | |
| KR | 10-2137539 B1 | 7/2020 | |
| KR | 10-2179236 B1 | 11/2020 | |
| KR | 10-2252592 B1 | 5/2021 | |
| KR | 10-2261757 B1 | 6/2021 | |
| KR | 10-2274922 B1 | 7/2021 | |
| KR | 10-2021-0103180 A | 8/2021 | |

OTHER PUBLICATIONS

Extended European Search Report dated Oct. 14, 2024 issued in European Patent Application No. 22883726.6.

Office Action dated Mar. 6, 2025 corresponding to Korean Patent Application No. 10-2021-0140199.

International Search Report (with partial translation) and Written Opinion dated Oct. 28, 2022, issued in International Patent Application No. PCT/KR2022/010950.

Decision of Rejection dated Aug. 12, 2025 issued in corresponding Japanese Patent Application No. 2023-574479. (Note: KR 10-2261757 B1 already submitted.).

Office Action dated Mar. 24, 2026 issued in the corresponding Chinese Patent Application No. 202280042126.8.

* cited by examiner

ELECTRODE SURFACE INSPECTION DEVICE

TECHNICAL FIELD

The present application claims the benefit of priority based on Korean Patent Application No. 10-2021-0140199filed on Oct. 20, 2021, the entire contents of which are incorporated herein by reference.

The present disclosure relates to an electrode surface inspection device.

BACKGROUND ART

With increasing technological development and demand for mobile devices, rechargeable secondary batteries are widely used as energy sources for various mobile devices. In addition, the secondary batteries are attracting attention as an energy source for electric vehicles and hybrid vehicles, which are proposed as a solution plan for air pollution of existing gasoline and diesel vehicles.

The secondary batteries are classified into coin-shaped batteries, cylindrical batteries, rectangular batteries, and pouch-shaped batteries depending on the shape of the battery case. Among them, when inspecting the surface of electrodes used in the cylindrical batteries in particular, there are cases where only some regions in which electrode tabs and electrode tapes exist are partially inspected, and the entire surface region of the electrodes is not inspected. In addition, since the image quality is affected by the uniformity of the brightness of the image measured when inspecting and the degree of image distortion, there is a problem that the detection power may decrease.

PRIOR ART DOCUMENT

Patent Document

Korean Laid-open Patent Publication No. 10-2021-0103180 (Aug. 23, 2021)

DISCLOSURE

Technical Problem

It is an object of the present disclosure to provide an electrode surface inspection device capable of inspecting the entire region of the electrode surface.

It is another object of the present disclosure to provide an electrode surface inspection device having improved detection power.

Technical Solution

In order to solve the above problems, the present invention provides, as an embodiment, an electrode surface inspection device which includes a transport unit that transports an electrode; a lighting that illuminates at least one side of the electrode; and a camera that captures plurality of images including each of a plurality of adjacent regions along a longitudinal direction of the electrode on at least one side of the electrode, and crops images of each of the plurality of regions of the electrode from each of the plurality of images to acquire images of each of the plurality of regions of the electrode.

Advantageous Effects

As an effect, the present disclosure can provide an electrode surface inspection device capable of inspecting the entire regions of the electrode surface.

As another effect, the present disclosure can provide an electrode surface inspection device having improved detection power.

MODES OF PRACTICE

Figure 1:
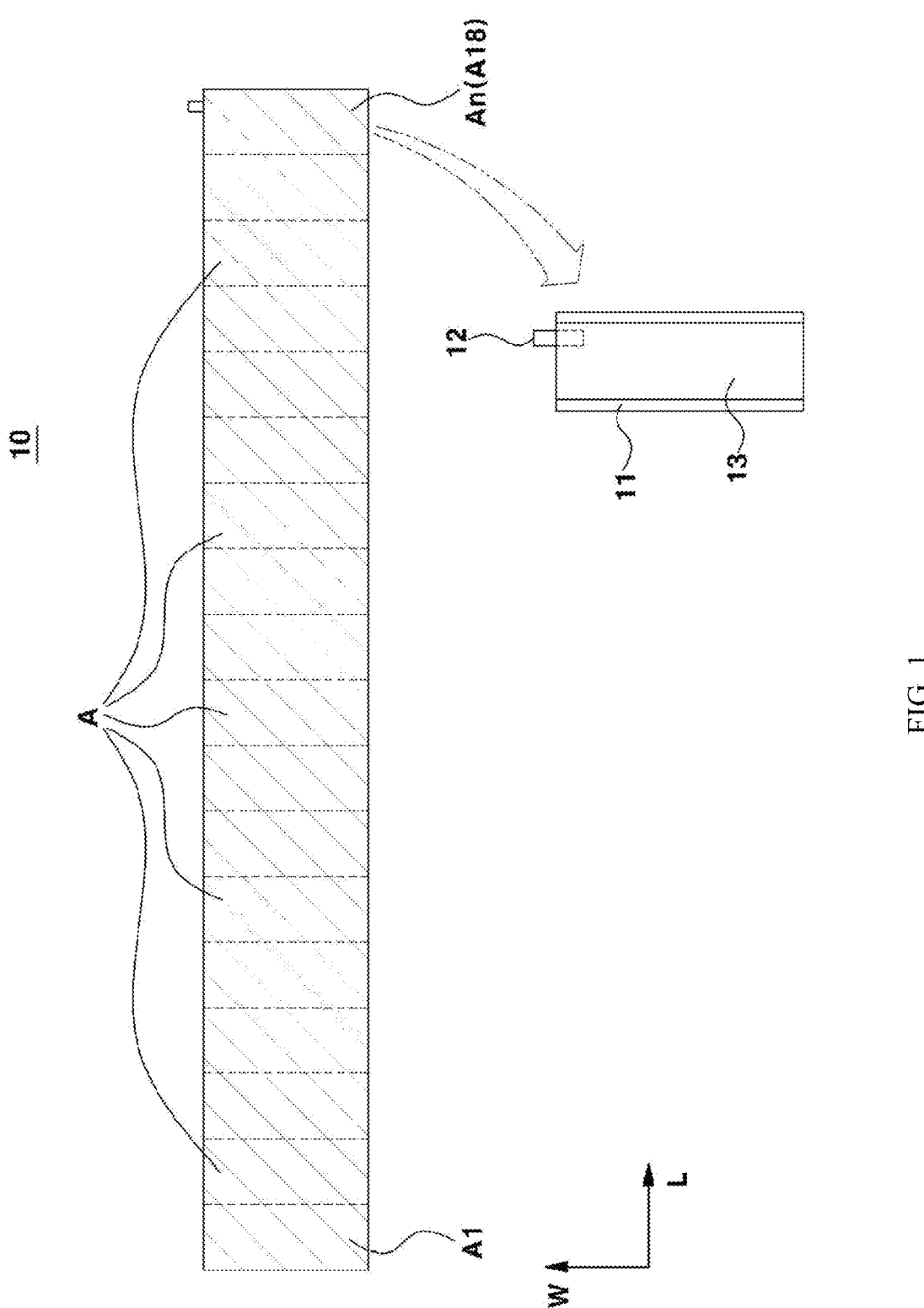
FIG. 1 shows a plan view of an electrode to be inspected by an electrode surface inspection device according to an embodiment of the present invention.

Hereinafter, embodiments of the present invention will be described in detail with reference to the accompanying drawings. For convenience of explanation, all or part of the configuration may be exaggerated in the drawings.

Furthermore, the present invention is not limited to the accompanying drawings or the contents described in this specification, and it is obvious to those skilled in the art that the present invention can be embodied in various forms without departing from the technical spirit of the present invention.

FIG. 1 shows a plan view of an electrode to be inspected by the electrode surface inspection device according to the embodiment of the present invention.

Although an electrode 10 may be a cylindrical battery electrode used in a cylindrical battery, electrodes used in other types of batteries may also be inspected by the electrode surface inspection device according to the embodiment of the present invention. The electrode 10 can have a quadrangular shape in which a longitudinal direction L is longer than a width direction W. When manufacturing a cylindrical battery, the electrode 10 can be wound with a separation film.

The electrode 10 includes a first region A1 to an n-th region An, which are a plurality of adjacent regions (A) along the longitudinal direction L of the electrode 10. That is, the plurality of regions (A) of the electrode 10 are sequentially disposed along the longitudinal direction L, and one of the plurality of regions (A) of the electrode 10 is disposed adjacent to the other (or both) of the plurality of regions (A) of the electrode 10 that is disposed closest thereto so that boundaries abut each other. Although the plurality of regions (A) are shown as including the first regions A1 to an eighteenth region A18, this is merely an example, and the number of the plurality of regions (A) is not particularly limited. In addition, it can be seen that only a part of the plurality of regions (A) of the electrode 10 is denoted by a reference numeral 'A' in the drawing for the sake of convenience.

However, the plurality of regions (A) of the electrode 10 are for separately describing different regions of the electrode 10 included in each of the images captured and cropped by the camera 130, which will be described later. However, the plurality of regions (A) of the electrode 10 do not have visible boundaries to each other.

The size of each of the plurality of regions (A) of electrode 10 can be substantially the same as each other. In other words, the length and width of each of the regions A of the electrode 10 can be substantially the same as each other. In this specification, the length means a length in the longitudinal direction L, and a width means the length in the width direction W.

Meanwhile, the electrode 10 may include an electrode sheet 11, an electrode tab 12 and an insulating member 13. The electrode sheet 11 may have an electrode active material applied to at least a part of the electrode current collector. The electrode tab 12 is disposed on the electrode sheet 11 and has a region protruding from the electrode sheet 11. The insulating member 13 is disposed on at least one of both sides of the electrode sheet 11 and covers the region of the electrode tab 12 disposed on the electrode sheet 11. For example, the insulating member 13 can be disposed on each side of the electrode sheet 11 to sandwich the electrode tab 12. The insulating member 13 may be a heat resistant tape, but is not limited thereto.

However, the structure of the electrode inspected by the electrode surface inspection device according to the embodiment of the present invention is not limited to the structure of the electrode 10 shown in the drawing. For example, an electrode to be inspected by the electrode surface inspection device may have a structure in which a part of the configuration shown in the drawing is omitted, or may have a structure further including a configuration other than the configuration shown in the drawing.

Figure 2:
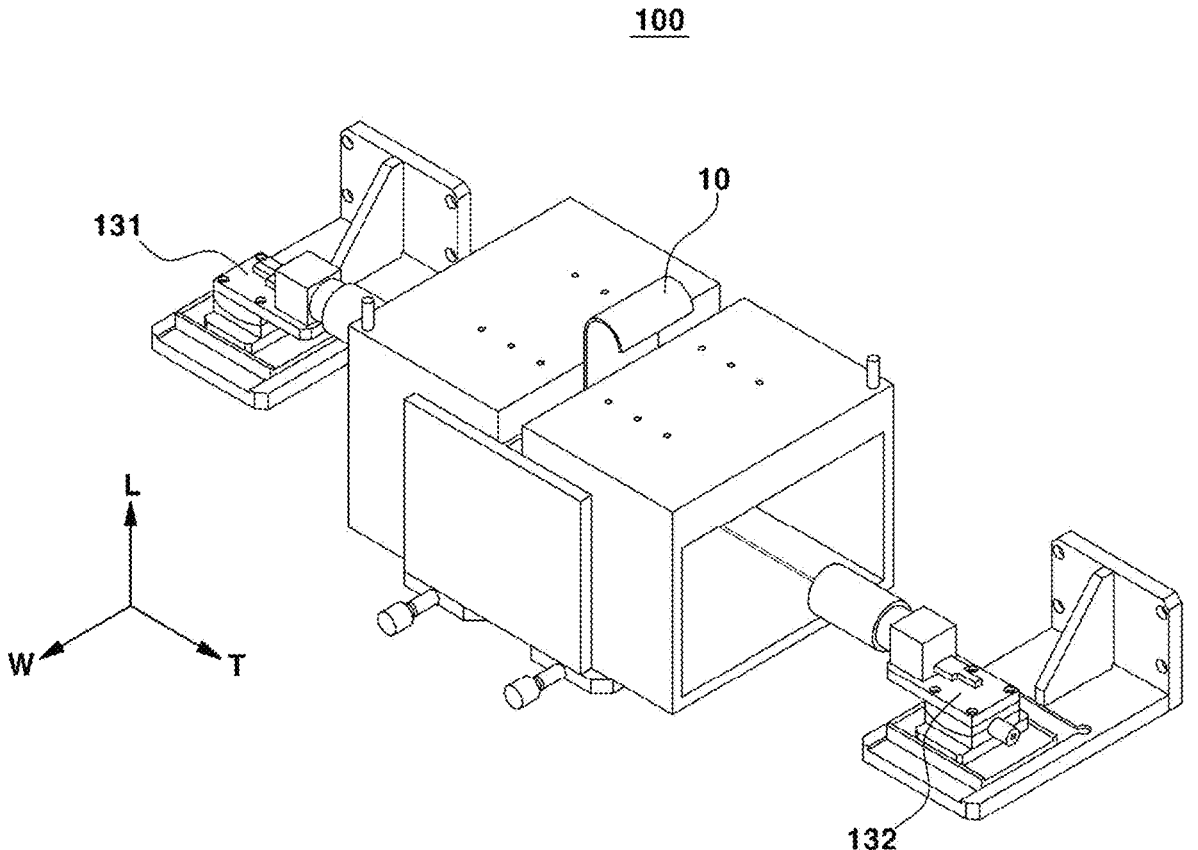
FIG. 2 is a perspective view of the electrode surface inspection device according to an embodiment of the present invention.

FIG. 2 is a perspective view of an electrode surface inspection device according to an embodiment of the present invention.

Figure 3:
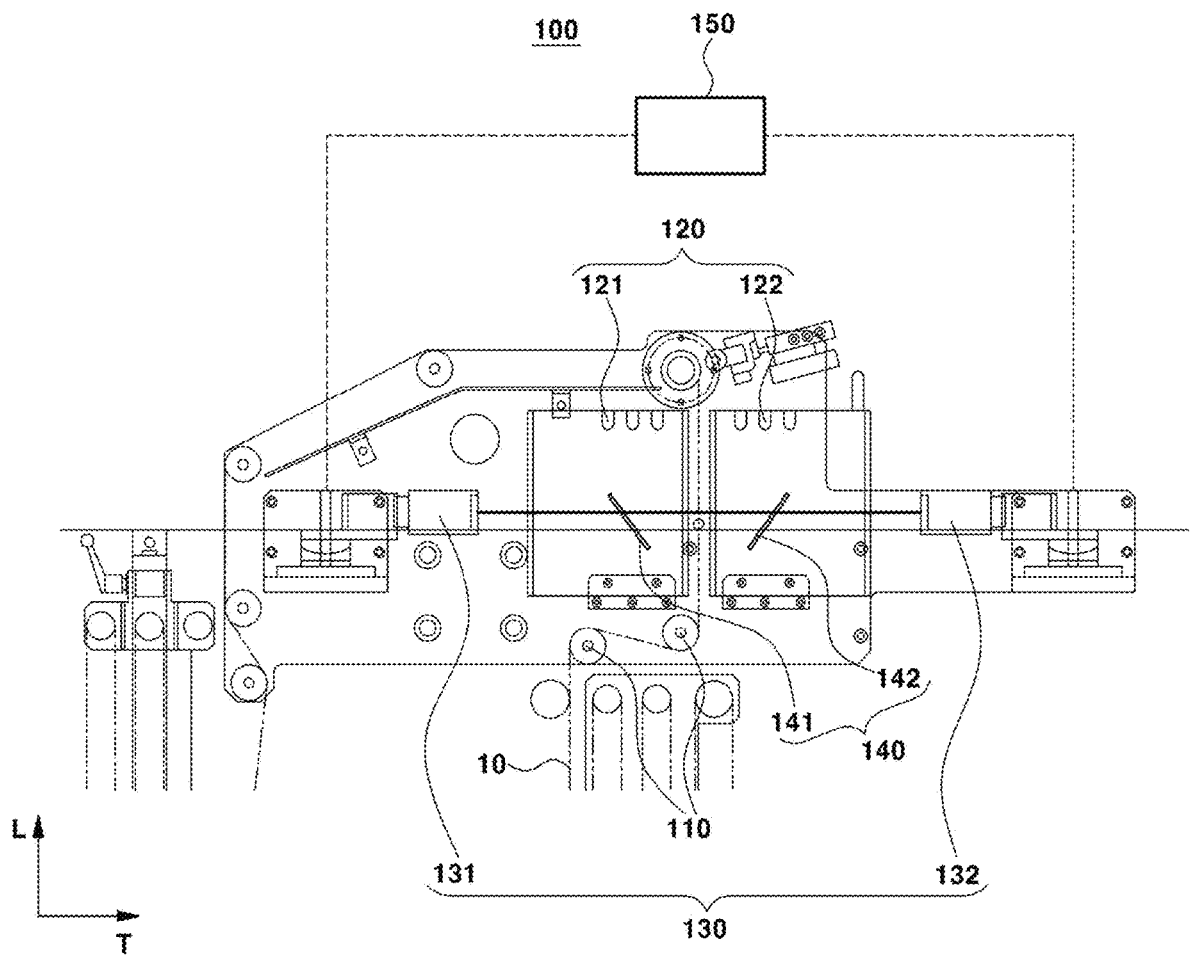
FIG. 3 is a cross-sectional view of the electrode surface inspection device according to an embodiment of the present invention.

FIG. 3 is a cross-sectional view of an electrode surface inspection device according to an embodiment of the present invention.

The electrode surface inspection device 100 according to an embodiment of the present invention includes at least one of a transport unit 110 that transports an electrode 10, a lighting 120 that illuminates at least one side of the electrode 10, a camera 130 that captures a plurality of images including each of the plurality of adjacent regions (A) along the longitudinal direction L of the electrode 10 of at least one side of the electrode 10 and crops of the images of each of the plurality of regions (A) of the electrode 10 from each of the plurality of images to acquire images of each of the plurality of regions (A) of the electrode 10, a mirror 140 on which light irradiated from the lighting 120 is incident and from which the incident light is reflected to at least one side of the electrode 10, and a merging unit 150 that forms an image in which the images of each of the plurality of regions (A) of the electrode 10 are sequentially joined.

The transport unit 110 transports the electrode 10, and specifically may transport the electrode 10 in the longitudinal direction L of the electrode 10. The transport unit 110 may transport the electrode 10 by including a roller for transporting the electrode 10, but is not limited thereto.

The lighting 120 illuminates at least one surface of electrode 10. The lighting 120 may directly irradiate at least one side of the electrode 10 with light to illuminate at least one side of the electrode 10, or may indirectly irradiate at least one side of the electrode 10 with light to illuminate at least one side of the electrode 10. For example, the lighting 120 can irradiate the mirror 140 with light, and the light incident on the mirror 140 can be reflected to reach at least one side of the electrode 10. Therefore, the lighting 120 can indirectly irradiate at least one side of the electrode 10 to illuminate at least one side of the electrode 10.

The lighting 120 can include a first lighting 121 and a second lighting 122 that illuminate each of both sides of electrode 10. Therefore, the lighting 120 can light both sides of the electrode 10. In other words, the first lighting 121 can light one side of the electrode 10 and the second lighting 122 can light the other side opposite to the one side of the electrode 10. In this specification, one side and the other side of the electrode 10 can face each other in the thickness direction T. Although the first lighting 121 and the second lighting 122 can directly irradiate both sides of the electrode 10 with light to illuminate both sides of the electrode 10, it is also possible to indirectly irradiate both sides of the electrode 10 with light to illuminate both sides of the electrode 10.

The camera 130 can be disposed on at least one side of the electrode 10. However, the fact that the camera 130 can be disposed on at least one side of the electrode 10 does not preclude a case where other configurations are interposed between the camera 130 and the electrode 10. For example, the mirror 140 can be disposed between the camera 130 and the electrode 10.

The camera 130 captures a plurality of images including each of the plurality of adjacent regions (A) along the longitudinal direction L of the electrode 10 on at least one side of the electrode 10, and crops images of each of the plurality of regions (A) of the electrode 10 from each of the plurality of images to acquire images of the plurality of regions (A) of the electrode 10.

The camera 130 may be an Area Scan Camera. Therefore, it is possible to capture a plurality of images including each of the plurality of adjacent regions (A) along the longitudinal direction L of the electrode 10 on at least one side of the electrode 10.

Additionally, the camera 130 may have an adjustable region of interest function (adjustable ROI function). Accordingly, the camera 130 can crop the image of each of the plurality of regions (A) of the electrode 10 with the adjustable region of interest function.

On the other hand, the images captured by the camera 130 can include images of the region of the entire surfaces of electrode 10, including the electrode sheet 11, the electrode tab 12 and the insulating member 13. Therefore, the entire surface region of the electrode 10 can be inspected through the image acquired by the camera 130. However, the image of the entire surface region of the electrode 10 is not included in one image, and each image of the plurality of regions (A) of the electrode 10 may be dividedly present in the plurality of images. Each image of the plurality of regions (A) may be sequentially joined into one image by the merging unit 150.

In the image of each of the plurality of regions (A) of the electrode 10 acquired by the camera 130, that is, the image after being cropped, the brightness between each region may be substantially uniform. Specifically, each of the images of the plurality of regions (A) of the electrode 10 may be a gray scale image. At this time, deviation of the gray level between pixels (gray values are from 0 to 255) can be about 5% or less within each image of the plurality of regions (A) of the electrode 10. Each image of the plurality of regions (A) of the electrode 10, which is a gray scale image, may be formed by converting a color image into gray scale, but is not limited thereto.

The camera 130 can include a first camera 131 that acquires images of each of the plurality of adjacent regions

5

(A) along the longitudinal direction L of the electrode 10 on one side of the electrode 10, and a second camera 132 that acquires images of each of the plurality of adjacent regions (A) along the longitudinal direction L of the electrode 10 on the opposite side to one side of the electrode 10. Therefore, the camera 130 can acquire images of each of the plurality of regions (A) on each of both sides of the electrode 10. Accordingly, it is possible to acquire an image of the entire region on both sides of the electrode 10 and inspect the entire region on both sides of the electrode 10.

Light irradiated from the lighting 120 is incident on the mirror 140, and the light incident on the mirror 140 can be reflected on at least one side of the electrode 10. However, when the lighting 120 can directly irradiate at least one side of the electrode 10 with light, the mirror 140 may not be necessary.

The mirror 140 can be disposed obliquely between the electrode 10 and the camera 130. The lighting 120 can then be disposed on the mirror 140 in the region between the electrode 10 and the camera 130. That is, in this case, lighting 120 may be coaxial lighting. Specifically, the mirror 140 can be disposed to face between the electrode 10 and the lighting 120 at a predetermined angle with each of the electrodes 10 and the lighting 120. For example, the mirror 140 can be disposed to face between the electrode 10 and lighting 120 at an angle of about 45° with the electrode 10 and the lighting 120, respectively. The mirror 140 may be the camera 130 or the like, and may be a semi-transmissive mirror to transmit light to the camera 130. At this time, the light irradiated from the lighting 120 may be reflected after being incident on the mirror 140, and may be incident on the camera 130 after being incident on the electrode 10 and then reflected.

The mirror 140 can include a first mirror 141 on which light irradiated from the first lighting 121 is incident and from which the incident light is reflected on one side of the electrode 10, and a second mirror 142 on which light irradiated from the second lighting 122 is incident and from which the incident light reflects on the opposite side to one side of the electrode 10. Therefore, light irradiated from each of the first lighting 121 and the second lighting 122 can reach both sides of the electrode 10 via the first mirror 141 and the second mirror 142, respectively. The first mirror 141 and the second mirror 142 may be obliquely disposed to face each other with the electrode 10 interposed therebetween. At this time, the first mirror 141 and the second mirror 142 may be disposed to be inclined in opposite directions from each other.

The merging unit 150 forms an image in which the images of the plurality of regions (A) of the electrode 10 acquired by the camera 130 are joined sequentially. That is, the merging unit 150 forms an image in which the images of the first region (A1) to the n-th area (An) of the electrode 10 acquired by the camera 130 are joined sequentially. Therefore, the merging unit 150 can form an image corresponding to at least one side of the electrode 10. When the camera 130 includes the first camera 131 and the second camera 132, the merging unit 150 can form respective images corresponding to both sides of the electrode 10. The image formed by the merging unit 150 can be substantially identical in structure to the surface of the electrode 10 shown in FIG. 1. However, since the image formed by the merging unit 150 is a form in which a plurality of images are joined, boundaries may exist between the images of the plurality of regions (A) of the electrode 10.

The merging unit 150 may be disposed inside or outside the camera 130. In other words, the merging unit 150 may be a device embedded in the camera 130 or another device that receives images from the camera 130.

On the other hand, when inspecting the surface of an electrode, especially an electrode used in a cylindrical battery, there are cases where only a partial region in which the electrode tab and the electrode tape exist is inspected, and the entire surface region of the electrode is not inspected. In addition, since the image quality is affected by the uniformity of the brightness of the image measured when inspecting and the degree of image distortion, there is a problem that the detection power may decrease.

According to an embodiment of the present invention, the camera 130 captures the plurality of images including each of the plurality of adjacent regions (A) along the longitudinal direction L of the electrode 10, and crops images of each of the plurality of regions (A) of the electrode 10 from each of the plurality of captured images to obtain images of each of the plurality of regions (A) of the electrode 10. Also, the images of each of the plurality of regions (A) of the electrode 10 acquired by the camera 130 may be sequentially joined into one image by the merging unit 150. Accordingly, it is possible to provide an electrode surface inspection device capable of integrally inspecting the entire region of the electrode surface.

Further, the camera 130 may only crop region of uniform brightness, and the brightness between each region may be substantially uniform in the image after being cropped. This can be achieved by setting a crop line c to only crop region of uniform brightness. As a result, it is possible to provide an electrode surface inspection device with improved detection capability by performing inspection through an image with improved brightness uniformity.

Figure 4:
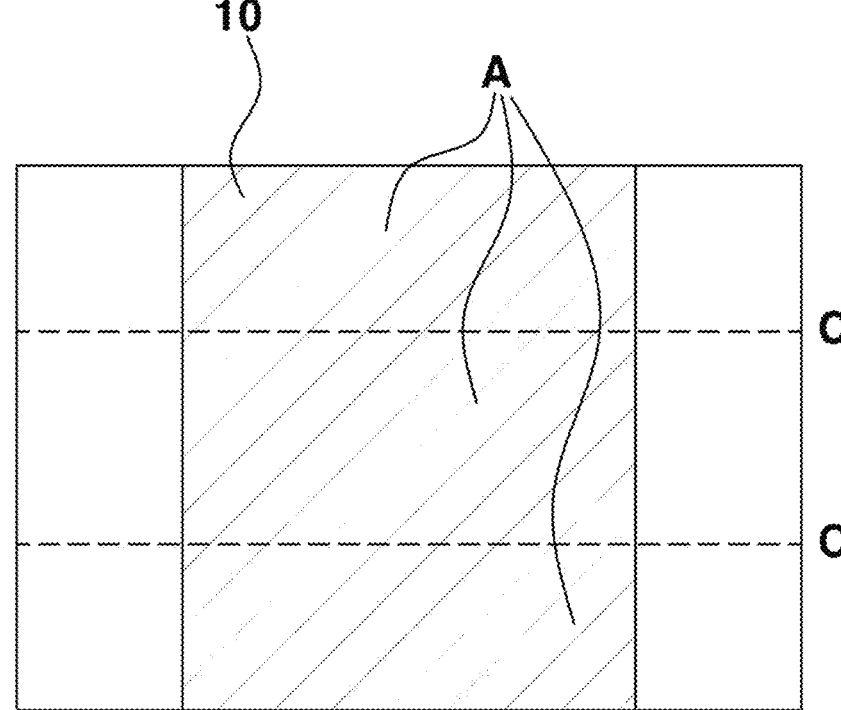
FIG. 4 shows a region captured and cropped by a camera of the electrode surface inspection device according to an embodiment of the present invention.
Figure 4:
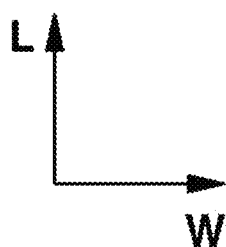

FIG. 4 shows a region captured and cropped by the camera of the electrode surface inspection device according to an embodiment of the present invention.

The image captured by the camera 130 includes one of the plurality of regions (A) on at least one side of electrode 10. However, as shown in the drawings, the image captured by the camera 130 may further the other one or more of the plurality of regions (A) of the electrode 10 (for example, the other two of the plurality of regions (A) of the electrode 10). Accordingly, the camera 130 crops the captured image along the crop line c to obtain an image including only one of the plurality of regions (A) of the electrode 10. That is, the image acquired by camera 130 includes only one of the plurality of regions (A) of electrode 10 and does not include the other one or more of the plurality of regions (A) of the electrode 10. However, the image acquired by the camera 130 may include an image of the surrounding region of the electrode 10. The crop line c is parallel to the width direction W, and thus, it is possible to acquire image including only one of the plurality of adjacent regions (A) of the electrode 10 along the longitudinal direction L after being cropped.

In the above, although the present invention has been described with reference to limited embodiments and drawings, the present invention is not limited thereto, and also it is apparent that various modifications and variations can be made by those of ordinary skill in the art to which the present invention pertains within the scope of equivalents of the technical spirit of the present invention and the claims to be described below.

In this specification, the order of first, second, etc. is to distinguish components from each other and does not imply a priority between components or an absolute order. In some parts of the specification, the first component may be referred to as the second component in other parts of the specification.

The terms and expressions herein should be interpreted broadly and not in a restrictive sense. As used herein, the term "comprising" does not exclude the presence or addition of one or more other components in addition to the recited components.

In this specification, the singular forms include the plural forms unless the context clearly dictates otherwise.

Each embodiment described herein as an example is combinable with each other, and unless inconsistent, contents described in one embodiment can be similarly applied to other embodiments even if not described in other embodiments.

DESCRIPTION Of THE REFERENCE
NUMERALS

10: Electrode
11: Electrode sheet
12: Electrode tab
13: Insulating member
A: plurality of regions of electrode
100: Electrode surface inspection device
110: Transport unit
120, 121, 122: Lighting
130, 131, 132: Camera
140, 141, 142: Mirror
150: Merging unit

The invention claimed is:

1. An electrode surface inspection device, comprising:
a transporter configured to transport an electrode in a longitudinal direction of the electrode;
a light source configured to illuminate at least one side of the electrode; and
a camera configured to capture a plurality of images including images of a plurality of adjacent regions along the longitudinal direction of the electrode on the at least one side of the electrode, and configured to crop the images of the plurality of adjacent regions of the electrode to acquire images of the plurality of adjacent regions of the electrode,
wherein:
the camera is configured to not capture an entire surface of the electrode as a single image;
the plurality of adjacent regions of the electrode are disposed sequentially along the longitudinal direction of the electrode; and
each of the plurality of adjacent regions of the electrode is captured as a divided image of the electrode, and
wherein:
each of the acquired images of the plurality of adjacent regions of the electrode is a gray scale image; and
a deviation of gray level between pixels is equal to or less than 5%, within the acquired images of the plurality of adjacent regions of the electrode.

2. The electrode surface inspection device according to claim 1, further comprising:
a mirror,
wherein when light irradiated from the light source is incident on the mirror, the incident light from the mirror reflects on the at least one side of the electrode, and
wherein the light is irradiated from the light source along the longitudinal direction of the electrode.

3. The electrode surface inspection device according to claim 1, further comprising:
a merger configured to form an image in which the acquired images of the plurality of adjacent regions of the electrode are joined sequentially.

4. The electrode surface inspection device according to claim 1,
wherein the camera is an area scan camera.

5. The electrode surface inspection device according to claim 1,
wherein the camera is configured to crop the captured images of the plurality of adjacent regions of the electrode with an adjustable region of interest function.

6. The electrode surface inspection device according to claim 1,
wherein:
the light source includes a first light source and a second light source configured to illuminate a first side and a second side of the electrode, respectively; and
the camera includes a first camera configured to capture the images of the plurality of adjacent regions of the at least one side of the electrode along the longitudinal direction of the electrode, and a second camera configured to capture images of a plurality of adjacent regions of the other side opposite to the at least one side of the electrode along the longitudinal direction of the electrode.

7. The electrode surface inspection device according to claim 2,
wherein:
the camera is disposed on the at least one side of the electrode;
the mirror is disposed obliquely between the electrode and the camera; and
the light source is disposed on the mirror in a region between the electrode and the camera.

8. The electrode surface inspection device according to claim 1,
wherein the electrode includes an electrode sheet, an electrode tab disposed on the electrode sheet and having a region protruding from the electrode sheet, and an insulating member that covers a region of the electrode tab disposed on the electrode sheet.

9. The electrode surface inspection device according to claim 8,
wherein the plurality of images captured by the camera includes images of an entire surface of the electrode, including the electrode sheet, the electrode tab, and the insulating member.

10. The electrode surface inspection device according to claim 1, further comprising:
a merger,
wherein the merger is configured to sequentially join the acquired images of the plurality of adjacent regions of the electrode to form a single image of the electrode.

11. The electrode surface inspection device according to claim 1, wherein:
the at least one side of the electrode faces the camera;
the light source does not face the at least one side of the electrode; and
light is irradiated from the light source along the longitudinal direction of the electrode.

* * * * *